(12) United States Patent
Kageyama (10) Patent No.: US 9,812,728 B2
(45) Date of Patent: Nov. 7, 2017

(54) FUEL-CELL SINGLE CELL

(71) Applicant: Nissan Motor Co., Ltd., Kanagawa (JP)

(72) Inventor: Kazuhiro Kageyama, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 64 days.

(21) Appl. No.: 14/442,993

(22) PCT Filed: Nov. 6, 2013

(86) PCT No.: PCT/JP2013/079959
§ 371 (c)(1),
(2) Date: May 14, 2015

(87) PCT Pub. No.: WO2014/080761
PCT Pub. Date: May 30, 2014

(65) Prior Publication Data
US 2015/0311560 A1    Oct. 29, 2015

(30) Foreign Application Priority Data
Nov. 21, 2012 (JP) ................. 2012-255138

(51) Int. Cl.
*H01M 8/24* (2016.01)
*H01M 8/10* (2016.01)
(Continued)

(52) U.S. Cl.
CPC ....... *H01M 8/2465* (2013.01); *H01M 8/0254* (2013.01); *H01M 8/0273* (2013.01); *H01M 8/1004* (2013.01); *H01M 8/242* (2013.01); *H01M 2008/1095* (2013.01); *H01M 2300/0082* (2013.01)

(58) Field of Classification Search
USPC ........................................ 429/457, 483, 535
See application file for complete search history.

(56) References Cited

U.S. PATENT DOCUMENTS

2003/0118889 A1\* 6/2003 Smith ................. H01M 8/0273
429/510
2012/0156584 A1\* 6/2012 Uehara ............... H01M 8/0247
429/465

FOREIGN PATENT DOCUMENTS

JP    2002-083614 A    3/2002
JP    2005-116404 A    4/2005
(Continued)

OTHER PUBLICATIONS

International Search Report issued in PCT/JP2013/079959 dated Dec. 24, 2013 (2 pages).

*Primary Examiner* — Osei Amponsah
(74) *Attorney, Agent, or Firm* — Osha Liang LLP (57) ABSTRACT

A fuel-cell single cell has a membrane electrode assembly sandwiched between a pair of separators, and a sealing member that seals a gas channel formed between the membrane electrode assembly and the separators. An uneven portion is formed in a part of the membrane electrode assembly where the sealing member is disposed. A sealing member sump to trap the sealing member is provided at a side exposed to reactant gas pressure and a holder part for the sealing member are provided within a part of the separators where the sealing member is disposed. The uneven portion is opposed to the holder part.

6 Claims, 6 Drawing Sheets

(51) Int. Cl.
*H01M 8/2465* (2016.01)
*H01M 8/1004* (2016.01)
*H01M 8/242* (2016.01)
*H01M 8/0254* (2016.01)
*H01M 8/0273* (2016.01)
*H01M 8/1018* (2016.01)

(56) References Cited

FOREIGN PATENT DOCUMENTS

| | | |
|---|---|---|
| JP | 2006-019204 A | 1/2006 |
| JP | 2007-035296 A | 2/2007 |
| JP | 2009-199741 A | 9/2009 |
| JP | 2010272474 A | 12/2010 |
| JP | 2012-063075 A | 3/2012 |
| WO | 2011/114811 A1 | 9/2011 |

* cited by examiner

FUEL-CELL SINGLE CELL

BACKGROUND

Technical Field

The present invention relates to an improvement of fuel cells such as polymer electrolyte fuel cells, and to a fuel-cell single cell which is stacked to constitute a fuel cell stack.

Related Art

Fuel cells have been known which use hydrogen-containing anode gas and oxygen-containing cathode gas as reactant gas to generate electric energy by an electrochemical reaction. Such fuel cells are divided into various types according to the electrolyte used, one of which uses a polymer electrolyte membrane.

Patent Document 1 discloses a fuel cell stack that is constituted by a stacked plurality of fuel-cell single cells, each of which includes a membrane electrode assembly (MEA) composed of a polymer electrolyte membrane and anode and cathode electrodes disposed on both sides thereof, and separators disposed on both sides of the membrane electrode assembly.

CITATION LIST

Patent Literature

Patent Document 1: Japanese Patent Unexamined Publication No. 2005-116404

SUMMARY OF INVENTION

In such fuel cell stacks as disclosed in Patent Document 1, the components including a membrane electrode assembly and separators are bonded to each other by means of an adhesive in order to provide a sealing property between the components. However, in such fuel cell stacks, since the adhesive is disposed at the edge part of the components and around a manifold of reactant gas, the adhesive that sticks out to the outside of the components or to the manifold may decrease the sealing performance.

One or more embodiments of the present invention provides a fuel-cell single cell that may be capable of achieving improved sealing performance.

A fuel-cell single cell according to one or more embodiments of the present invention includes a membrane electrode assembly sandwiched between a pair of separators, and a sealing member that seals a gas channel formed between the membrane electrode assembly and the separators. Further, in the fuel-cell single cell, an uneven portion is formed in the part of the membrane electrode assembly where the sealing member is disposed, and a sealing member sump is provided at a side exposed to reactant gas pressure and a holder part for the sealing member are provided within the part of the separators where the sealing member is disposed, in which the uneven portion is opposed to the holder part. In this configuration, a material that also serves as an adhesive can be used for the sealing member. The term "a side exposed to reactant gas pressure" refers to a side on which the pressure of reactant gas acts, specifically the inner side of gas channels and manifold holes for supplying or discharging the reactant gas.

With the above-described configuration, the pressure of the reactant gas acts on the end of the sealing member filling the sealing member sump so that the sealing member is in tight contact with the separators and the membrane electrode assembly. The fuel-cell single cell according to one or more embodiments of the present invention can therefore have improved sealing performance. Further, in the fuel-cell single cell, the uneven portion is formed in the part of the membrane electrode assembly where the sealing member is disposed. This increases the contact area between the membrane electrode assembly and the sealing member and thereby enables retaining both of a function of improving the adhesion strength and a function of transferring a load in the stacking direction. Furthermore, the contact area with the sealing member is increased and a long penetration path in the interface between them is secured, thereby provide a structure, in which a gas leak does not occur.

BRIEF DESCRIPTION OF DRAWINGS

FIG. 1(A) is a perspective view, and FIG. 1(B) is an exploded perspective view, of a fuel cell stack.

FIGS. 6(A)-6(C) are graphs illustrating the durability of a sealing member; specifically.

DETAILED DESCRIPTION

Figures 1A, 1B:
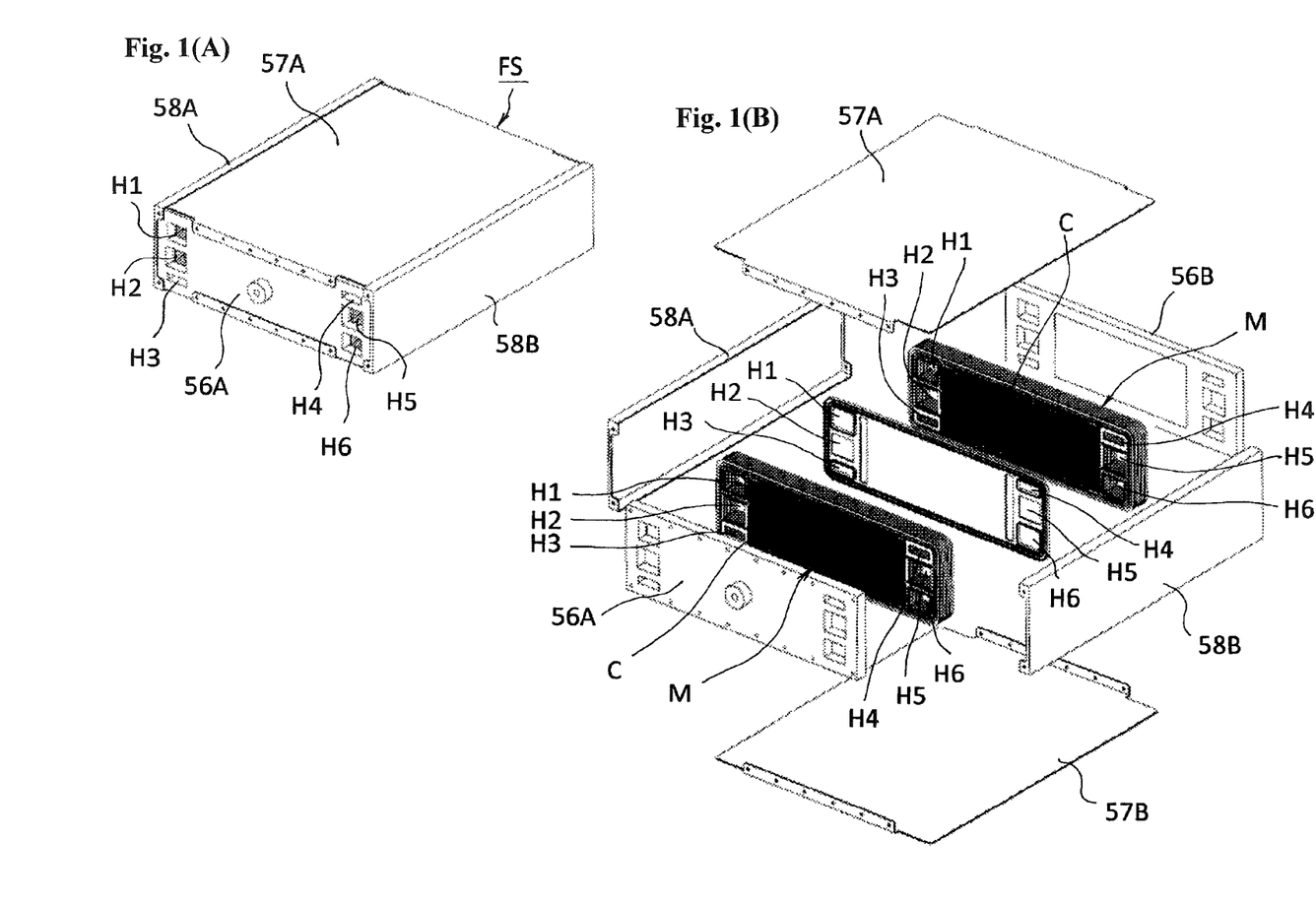

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. A fuel cell stack FS of FIGS. 1(A)-1(B) includes, particularly as illustrated in FIG. 1(B), a stacked plurality of cell modules M, each of which includes a stacked predetermined number of fuel-cell single cells C, and a sealing plate P interposed between the plurality of cell modules M. FIG. 1(B) illustrates only two cell modules M and one sealing plate P, but in practical use, more cell modules M and sealing plates P are stacked.

The fuel cell stack FS further includes end plates 56A, 56B disposed in both ends of the cell modules M in the stacking direction, fastening plates 57A, 57B disposed on both surfaces corresponding to the long sides of the fuel-cell single cells C (the upper and lower surfaces in FIGS. 1(A)-1(B)), and reinforcing plates 58A, 58B disposed on both surfaces corresponding to the short sides. The fastening plates 57A, 57B and the reinforcing plates 58A, 58B are coupled to both of the end plates 56A, 56B by bolts (not shown).

As described above, the fuel cell stack FS has a case-integrated structure as illustrated in FIG. 1(A), in which the cell modules M and the sealing plate P are restrained and pressed in the stacking direction so that a predetermined contact pressure is applied on each of the fuel-cell single cells C. With this structure, the gas sealing and the electrical conductivity are maintained at high level.

Figure 2:
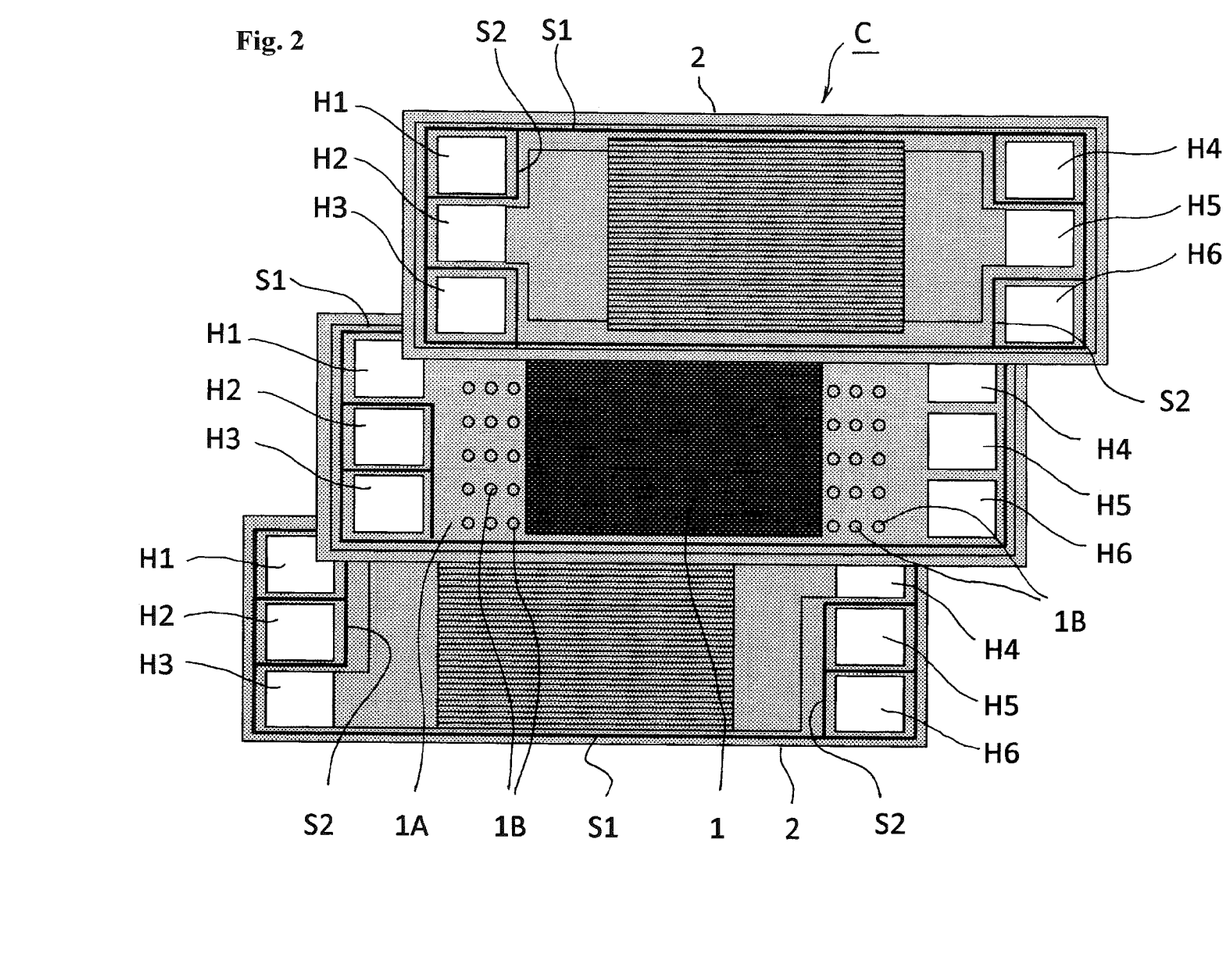
FIG. 2 is a plan view of a fuel-cell single cell, which is disassembled for explanation.

As illustrated in FIG. 2, each of the fuel-cell single cells C includes a membrane electrode assembly 1, a pair of separators 2, 2 sandwiching the membrane electrode assembly 1. The membrane electrode assembly 1 and the separators 2, 2 form gas channels GC, GA respectively for cathode gas and anode gas therebetween.

The membrane electrode assembly 1, which is generally referred to as an MEA (membrane electrode assembly), includes an electrolyte layer of a solid polymer that is interposed between a cathode layer and an anode layer, although they are not shown in detail in the figure. In one or more embodiments of the present invention, the membrane electrode assembly 1 further includes a resin frame 1A integrally formed at the outer periphery thereof.

The frame 1A is integrally formed with the membrane electrode assembly 1, for example, by injection molding. In one or more embodiments of the present invention, the frame 1A is formed in a rectangular shape, and the membrane electrode assembly 1 is located at the center. In the frame 1A, manifold holes H1 to H3 and H4 to H6 are provided, which are arranged such that each short side has three manifold holes. Areas between the manifold holes and the membrane electrode assembly 1 serve as diffuser parts. The frame 1A and the separators 2, 2 have a rectangular shape with substantially the same size and shape.

Further, the frame 1A includes a plurality of round protrusions 1B arranged in a matrix in the diffuser parts. When the single cells C deform in the thickness direction due to a change of the membrane electrode assembly 1 over time or the like, these protrusions 1B come in contact with the separators 2, 2 to secure the space where the reaction gas flows.

The separators 2 are metal plates in which one plate has reversed faces to those of the other plate. For example, the separators 2 are made of stainless steel, and may be formed in any suitable shape by press working. The separators 2 of one or more embodiments of the present invention have an uneven cross-sectional shape at least in the center part corresponding to the membrane electrode assembly 1. The uneven cross-sectional shape of the separators 2 continues in the length direction. The apexes of the corrugation are in contact with the membrane electrode assembly 1 while the bottoms of the corrugation form the cathode and anode gas channels (GC, GA) between the bottoms and the membrane electrode assembly 1. Further, each of the separators 2 has manifold holes H1 to H6 similarly to the frame 1A at both ends.

Figure 3A:
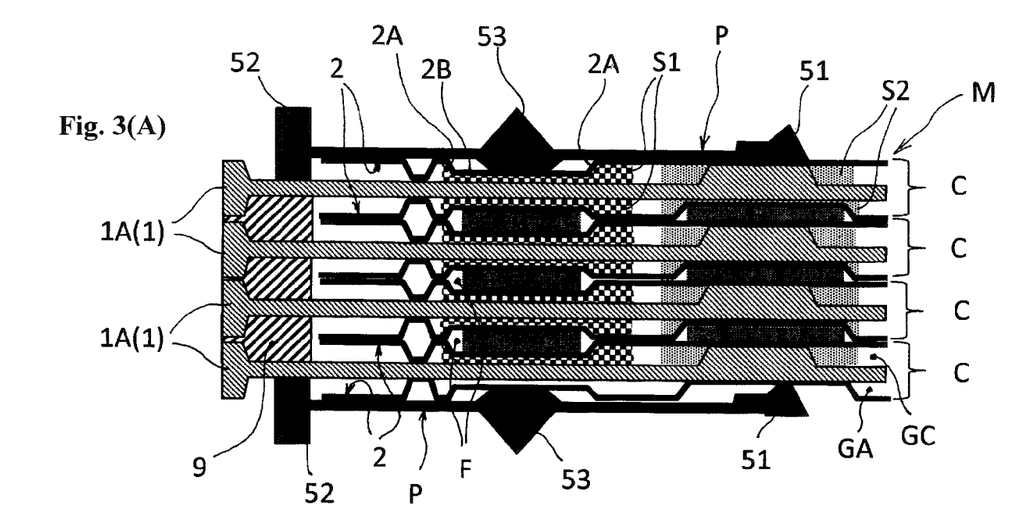
FIG. 3(A) is a cross sectional view around a manifold hole of a cell module.

The frame 1A and membrane electrode assembly 1 and the two separators 2, 2 are laminated together as illustrated in FIG. 3(A) to form the fuel cell C. A predetermined number of fuel cells C (four fuel cells in FIGS. 3(A)-3(B)) are stacked to from the cell module M. In this regard, two adjacent fuel-cell single cells C form a channel F for cooling fluid (e.g. water) therebetween, and two adjacent cell modules M also form a channel F for cooling fluid therebetween.

The manifold holes H1 to H3 on the left in FIG. 2 are configured respectively to supply anode gas (H1), to discharge cooling fluid (H2) and to discharge cathode gas (H3) from the top. These manifold holes are communicated with corresponding manifold holes in the stacking direction to form respective channels. The manifold holes H4 to H6 on the right in FIG. 2 are configured respectively to supply the cathode gas (H4), to supply the cooling fluid (H5) and to discharge the anode gas (H6) from the top. These manifold holes are communicated with corresponding manifold holes in the stacking direction to form respective channels. The positional relationship of the manifold holes H1 to H6 may be partly or fully reversed in respect of supply and discharge.

Further, in the fuel-cell single cell C, as illustrated in FIG. 2, sealing members S1, S2 are provided between the frame 1A and the separators 2 at the edge part thereof and around the manifold holes H1 to H6. In FIG. 2, the sealing members S1, S2 are partly overlapped with each other. The sealing members S1, S2, which also have a function as an adhesive, airtightly separate the gas channels GC, GA for the cathode gas and the anode gas from each other within respective interlayers. Further, openings are provided at suitable locations around the manifold holes H1 to H6 to lead corresponding fluids to the interlayers. In the fuel cell stack FS, the separators 2 of adjacent fuel-cell single cells are airtightly joined to each other at the outer periphery thereof so as to seal the channel F for the cooling fluid.

The sealing plate P is formed as a separate piece from the above-described fuel-cell single cells C. As illustrated in FIG. 1(B), manifold holes H1 to H6 are formed on both ends of a plate base 50 similarly with the frame 1A and the separators 2.

The plate base 50 is molded from a single electrically-conductive metal plate. The plate base 50 is formed in substantially the same shape and size as the above-described fuel-cell single cells C in the plan view. Since the plate base 50 is constituted by the electrically-conductive metal plate, it can provide stable electrical connection over time.

In the sealing plate P, sealing members 51 are formed around each of the manifold holes H1 to H6. Further, an outer sealing member 52 is formed along the outermost edge of the plate base 50, and an inner sealing member 53 is formed along the inner side of the outer sealing member 52 with a predetermined distance. These sealing members are individually formed all over the periphery in an endless shape. The sealing members 51 around the manifold holes H1 to H6 are formed independently from each other. These sealing members 51 to 53 are different components from the above-described sealing members S1, S2 interposed between the frame 1A and separators 2.

As illustrated in FIG. 3(A), the sealing plate P prevents a leak of the cooling fluid flowing through the cooling fluid channel between the cell modules M by means of the inner sealing member 53, and also keeps back rainwater from the outside by means of the outer sealing member 52. The sealing plate P also provides electrical insulation. In FIG. 3(A), reference sign 9 designates an adhesive.

In the above-described fuel cell stack FS, each of the cell modules M is constituted by a stacked predetermined number of fuel-cell single cells C, and the sealing plate is configured to be easily detachable from the cell modules M. Therefore, if there is a defect in one of the fuel-cell single cells C, it is possible to exchange only the cell module M that includes the faulty fuel-cell single cell C. Therefore, it is advantageous that the other fuel-cell single cells C and cell modules M can be further used continuously.

As described above, each of the fuel-cell single cells C of the above-described fuel cell stack FS includes the membrane electrode assembly 1 sandwiched between the separators 2, 2, and the sealing members S1, S2 that seals the gas channels (GC, CA) formed between the membrane electrode assembly 1 and the separators 2. The membrane electrode assembly 1 includes the resin frame 1A at the outer periphery thereof.

Figure 3B:
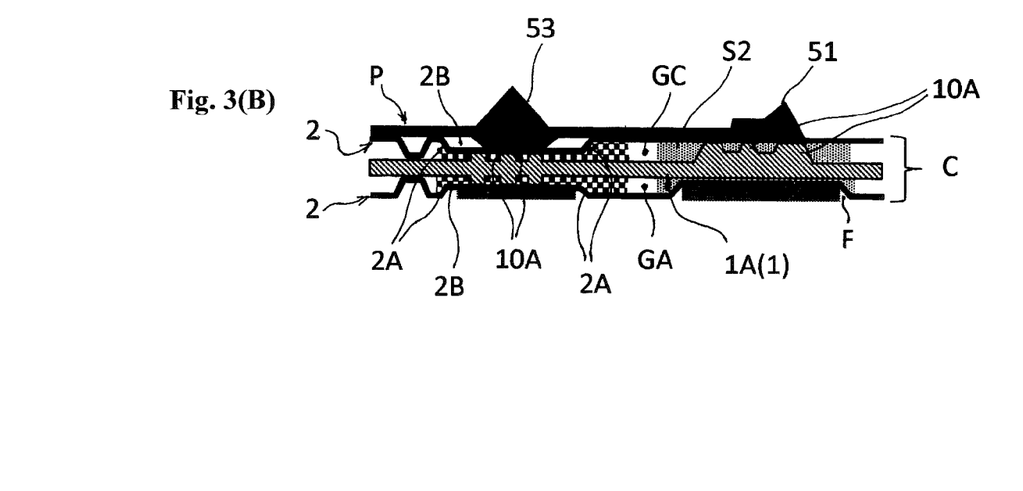
FIG. 3(B) is an enlarged cross sectional view of the part where a sealing member is disposed.
Figure 4A:
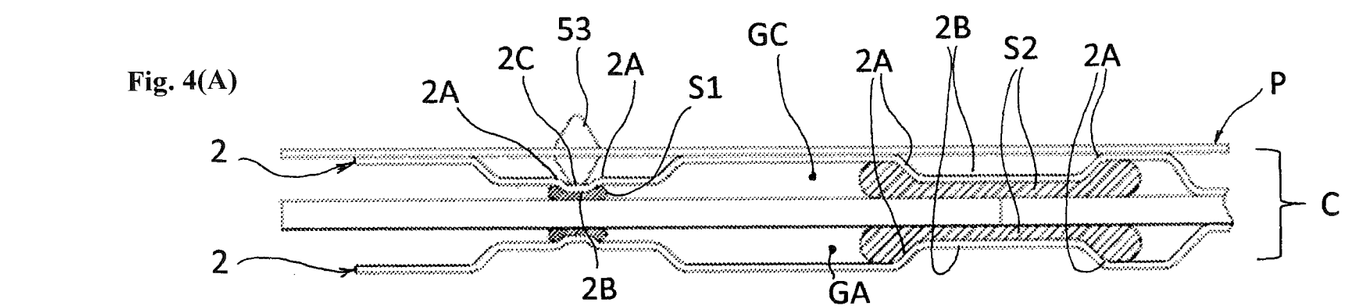
FIGS. 4(A) and 4(B) are cross sectional views of a main part of a fuel-cell single cell according to one or more embodiments of the present invention.
Figure 4B:
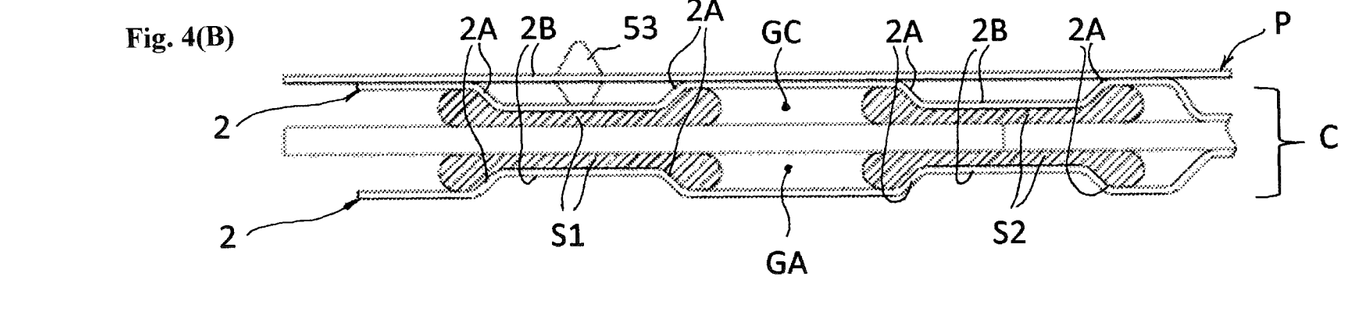

As illustrated in FIG. 3(B) and FIGS. 4(A)-4(B), each of the above-described fuel-cell single cells C includes a sealing member sump 2A to hold the sealing members S1, S2, which is formed at a side exposed to reactant gas pressure within the part of the separators 2 where the sealing member S is disposed. The term "a side exposed to reactant gas pressure" refers to a side on which the pressure of the reactant gas acts, for example the inner side of the gas channels GC, GA and the inner side of the manifold holes H1 to H6.

That is, for the sealing members 51 disposed at the edge part of the frame 1A and the separators 2, the sealing member sumps 2A are disposed at the side with the reactant gas, i.e. at least at the side with the gas channels GC, GA. For the sealing members S2 disposed around the manifold holes H1 to H6, since the reactant gas or the cooling fluid may be present on both sides thereof, the sealing member sumps 2A are disposed at least at the side exposed to higher pressure or at both sides.

In the embodiment of FIG. 3(B), for the sealing members S1 disposed on the edge part of the frame 1A and the separators 2, the sealing member sumps 2A are formed at both sides of the part of the separators 2 where the sealing members S1 are disposed. Specifically, a part of the separators 2 is bent outward with respect to the membrane electrode assembly 1 so that the bent part serves as the sealing member sump 2A. Further, in the separators 2, the flat parts between both sealing member sumps 2A, 2A serve as holder parts 2B for the sealing members S1. In the embodiment of FIG. 3(B), the sealing member sump 2A is not provided for the sealing members S2 disposed around the manifold holes H1 to H6.

According to one or more embodiments of the present invention, the fuel-cell single cell C may include an uneven portion that is formed in at least one of the membrane electrode assembly 1 and the separators 2 within the part where the sealing members S1, S2 are disposed. In one or more embodiments of the present invention, since the membrane electrode assembly 1 includes the frame 1A, the uneven portion is formed in at least one of the frame 1A and the separators 2.

In the embodiment of FIG. 3(B), uneven portions are provided within the parts where the sealing members S1, S2 are disposed, by forming a plurality of protrusions 10A in the frame 1A at predetermined intervals. That is, the uneven portions of the frame 1A are opposed to holder parts 2B of the separators 2. On the other side (outer side) from the holder parts 2B, the inner sealing member 53 and the sealing member 51 of the sealing plate P are disposed.

In the embodiments of FIGS. 4(A) and 4(B), double-sided sealing member sumps 2A and holder parts 2B are provided in the separators 2 for the sealing members S1, S2 disposed respectively in the edge part of the frame 1A and the separators 2 and around the manifold holes H1 to H6. In the embodiments of FIGS. 4(A)-4(B), the above-described uneven portion is not provided, but the inner sealing member 53 of the sealing plate P is disposed on the other side of the holder parts 2B. Particularly in the embodiment of FIG. 4(A), recesses 2C are formed in the holder parts 2B to position the inner sealing member 53 of the sealing plate P.

Figure 5A:
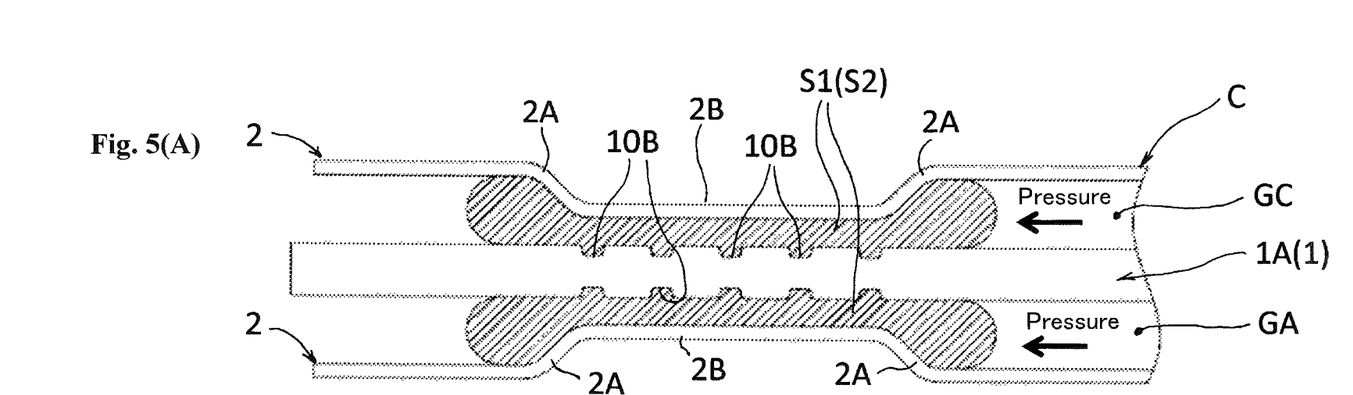
FIGS. 5(A) and 5(B) are cross sectional views of a main part of a fuel-cell single cell according to one or more embodiments of the present invention.
Figure 5B:
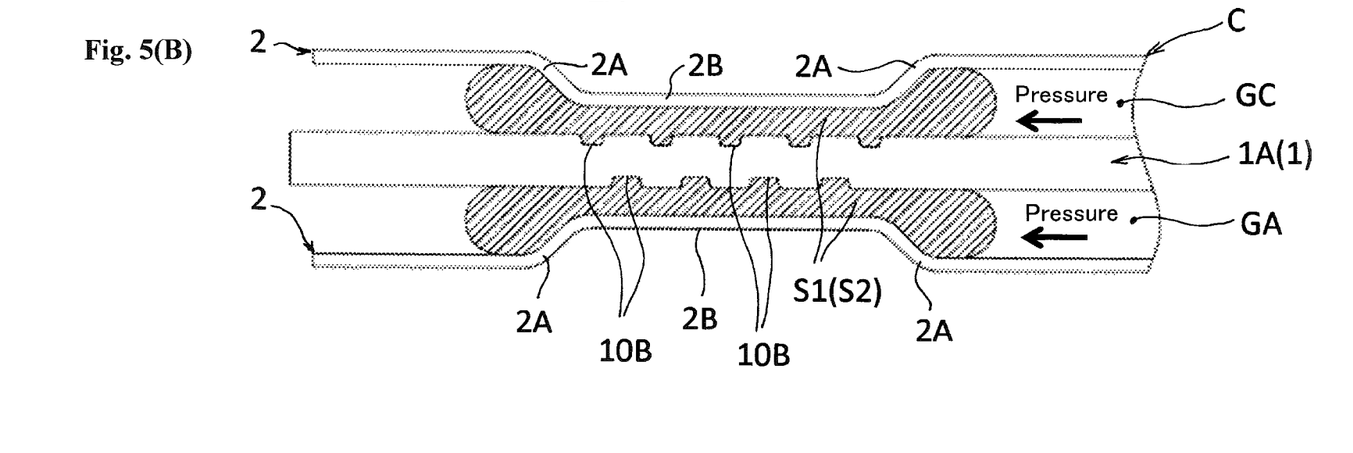

In the embodiments of FIGS. 5(A) and 5(B), the separators 2 include sealing member sumps 2A and holder parts 2B. Further, uneven portions are provided in the part of the frame 1A where the sealing members S1, S2 are disposed by forming a plurality of recesses 10B at predetermined intervals. In the embodiments of FIG. 5(A), the recesses 10B are identically formed on both sides of the frame 1A. In the embodiments of FIG. 5(B), the recesses 10B are alternately formed on both sides of the frame 1A.

The above-described fuel-cell single cells C can be manufactured by the following method. To manufacture the fuel-cell single cell C that includes the membrane electrode assembly 1 sandwiched between the pair of separators 2, 2, and the sealing members S1, S2 that seal the gas channels CG, AG formed between the membrane electrode assembly 1 and the separators 2, 2, the sealing member sumps 2A for the sealing members S1, S2 are formed at a side exposed to reactant gas pressure within the part of the separators 2 where the sealing members S1, S2 are disposed.

After the sealing members S1, S2 are disposed within the sealer disposing part of the separators 2, the separators 2 and the membrane electrode assembly 1 are joined to each other to form the gas channels CG, Ag sealed by the sealing members S1, S2 between them. Along with this, the sealing members S1, S2 are trapped in the sealing member sumps 2A so that they can receive a reactant gas pressure.

In the above-described fuel-cell single cells C, since the sealing member sumps 2A for the sealing members S1, S2 are provided at a side exposed to reactant gas pressure within the part of the separators 2 where the sealing members S1, S2 are disposed, the ends of the sealing members S1, S2 are formed into nubs filling the sealing member sumps 2A as illustrated in FIG. 3(B), FIGS. 4(A)-4(B) and FIGS. 5(A)-5(B).

Therefore, in the fuel-cell single cells C, a reactant gas pressure acts on the ends (end faces) of the sealing members S1, S2 filling the sealing member sumps 2A to press the sealing members S1, S2 so that they are in tight contact with the separators 2 and the frame 1A of the membrane electrode assembly 1. As a result, an improvement of the sealing performance can be achieved. Further, by the method of producing the fuel-cell single cell C, such fuel-cell single cells with high sealing performance can be readily produced.

In the fuel-cell single cell C, the uneven portions are formed in at least one of the frame 1A of the membrane electrode assembly 1 and the separators 2, specifically within the parts of the frame 1A where the sealing member S1, S2 are disposed in the embodiments of FIG. 3(B) and FIGS. 5(A)-5(B). They increase the contact area between the frame 1A and the sealing members S1, S2, and thereby can retain both of a function of improving the adhesion strength and a function of transferring a load in the stacking direction. In particular, the uneven portions constituted by the protrusions 10A as illustrated in FIG. 3(B) can reduce the gap between the frame 1A and the separators 2, which further improves the function of transferring a load in the stacking direction.

Further, in the fuel-cell single cells C, the uneven portions formed in the frame 1A as described above can secure a long penetration path in the interface between the frame 1 and the separators 2 as well as increasing the contact area with the sealing members S1, S2. That is, in this type of fuel-cell single cells, the tensile shear adhesion strength of the sealing members S1, S2 to the frame 1A is gradually reduced through exposure to pulsation of the reactant gas or the like over a long time, and the reactant gas or a product eventually penetrates into the interface between them.

In contrast, in the fuel-cell single cells C, the uneven portions secure a sufficient length of the interface from the gas channels GC, GA to the outside between the frame 1A and the sealing members S1, S2. Therefore, the reactant gas or a product does not reach the outside (a gas leak does not occur) even when the fuel-cell single cell C is used beyond its service life.

Figure 6A:
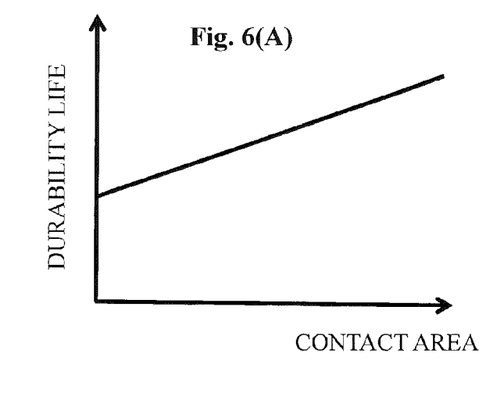
FIG. 6(A) is a graph illustrating the relationship between contact area between a sealing member and a frame and durability life.
Figure 6B:
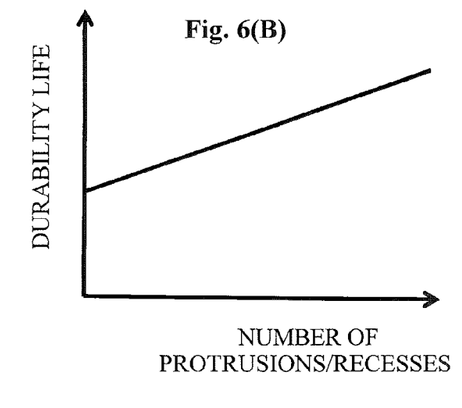
FIG. 6(B) is a graph illustrating the relationship between the number of protrusions/recesses formed in the sealing member and durability life.
Figure 6C:
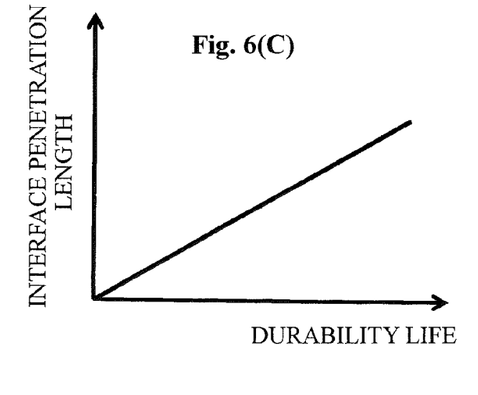
FIG. 6(C) is a graph illustrating the relationship between durability life and penetration length in the interface between a sealing member and a frame.

FIGS. 6(A)-6(C) are graphs illustrating the durability of the sealing members S1, S2 of the fuel-cell single cell C according to one or more embodiments the present invention. As illustrated in FIG. 6(A), it is possible to extend the durability life by forming the uneven portion in the frame 1A so as to increase the contact area with the sealing members S1, S2. As illustrated in FIG. 6(B), it is possible to extend the durability life by increasing the number of protrusions/recesses because it results in the increased contact area between the frame 1A and the sealing members S1, S2. As illustrated in FIG. 6(C), it is possible to extend the durability life by increasing the contact area (the number of protrusions/recesses) between the frame 1A and the sealing members S1, S2 so as to increase the penetration length in the interface.

Further, in the fuel-cell single cell C, the uneven portions of the frame 1A of the membrane electrode assembly 1 are opposed to the holder parts 2B of the separators 2 as illustrated in FIG. 3(B) and FIGS. 5(A)-5(B). Therefore, the fuel-cell single cells C can firmly hold the sealing members S1, S2 in the predetermined places and also adequately transfer a load in the stacking direction when they are assembled into the fuel cell stack FS.

Further, in the fuel-cell single cell C, the sealing members 51 to 53 of the sealing plate P are disposed on the outer face of the holder parts 2B as illustrated in FIG. 3(B) and FIGS. 4(A)-4(B). That is, the sealing members S1, S2 interposed between the frame 1A and the separators 2 are aligned with the sealing members 51 to 53 of the sealing plate P in the stacking direction. With this configuration, the fuel-cell single cells C can firmly hold the sealing members 51 to 53 of the sealing plate P in the predetermined places and also adequately transfer a load in the stacking direction through the sealing plate P.

Further, in the fuel-cell single cell C, the membrane electrode assembly 1 integrally includes the resin frame 1A, and the sealing members S1, S2 are interposed between the frame 1A and the separators 2. This structure provides high sealing performance at the outer side of the power generating area of the membrane electrode assembly 1 and can also facilitate forming machined parts including the sealing member sumps 2A, the holder parts 2B and the uneven portions (protrusions 10A and recesses 10B) without causing any negative influence on the power generating area.

In association with the improvement in durability of the above-described fuel-cell single cell C, the durability of the fuel cell stack FS, which is constituted by stacked fuel-cell single cells C, is also improved. Further, the improvement in load transfer in the stacking direction can equalize the surface pressure and the contact resistance between the fuel-cell single cells C and also equalize the power generation performance of each of the fuel-cell single cells C.

The configuration of the fuel-cell single cell is not limited to those of the above-described embodiments, and detail of the configuration may be suitably changed and the configurations of the above-described embodiments may be suitably combined with each other without departing from the gist of the present invention. For example, in one or more of the above-described embodiments, the uneven portion is formed within the part of the frame 1A of the membrane electrode assembly 1 where the sealing members are disposed. Instead, the uneven portion may be formed within the part of the separators 2 where the sealing members are disposed.

The uneven portion may be formed by a physical process or by a chemical process of surface modification (e.g. UV, plasma, corona, etc.).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

C Fuel-cell single cell
FS Fuel cell stack
GA Anode gas channel
GC Cathode gas channel
S1, S2 Sealing member
1 Membrane electrode assembly
1A Frame
2 Separator
2A Sealing member sump
2B Holder part
10A Protrusion
10B Recess

The invention claimed is:

1. A fuel-cell single cell, comprising:
a membrane electrode assembly sandwiched between a pair of separators; and
a sealing member that seals a gas channel formed between the membrane electrode assembly and the separators,
wherein an uneven portion is formed in a part of the membrane electrode assembly that directly contacts the sealing member,
wherein a sealing member sump to trap the sealing member is provided at a side exposed to reactant gas pressure and a holder part for the sealing member are provided within a part of the separators where the sealing member is disposed,
wherein the uneven portion is opposed to the holder part, and
wherein the uneven portion comprises a plurality of protrusions or a plurality of recesses at predetermined intervals on the membrane electrode assembly.

2. The fuel-cell single cell according to claim 1,
wherein the membrane electrode assembly comprises a resin frame integrally formed at an outer periphery, and
wherein the sealing member is interposed between the frame and the separators.

3. A fuel cell stack, comprising:
a stacked plurality of the fuel-cell single cell according to claim 1.

4. A fuel cell stack, comprising:
a stacked plurality of the fuel-cell single cell according to claim 2.

5. A fuel-cell single cell, comprising:
a membrane electrode assembly sandwiched between a pair of separators; and
a sealing member that seals a gas channel formed between the membrane electrode assembly and the separators,
wherein an uneven portion is formed in a part of the membrane electrode assembly where the sealing member is disposed,
wherein a sealing member sump to trap the sealing member is provided at a side exposed to reactant gas pressure and a holder part for the sealing member are provided within a part of the separators where the sealing member is disposed, wherein the uneven portion is opposed to the holder part, wherein the uneven portion comprises a plurality of protrusions or a plurality of recesses at predetermined intervals on the membrane electrode assembly, and wherein the sealing member sump is a bent portion of at least one of the separators.

6. The fuel-cell single cell of claim 1, wherein the reactant gas pressure acts on the sealing member that fills the sealing member sump to create tight contact between the sealing member and the separators and the membrane electrode assembly.

* * * * *